US008693734B2

(12) United States Patent
Jin

(10) Patent No.: US 8,693,734 B2
(45) Date of Patent: Apr. 8, 2014

(54) DETECTING POORLY CONDITIONED POINTS IN BUNDLE ADJUSTMENT

(75) Inventor: Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 201 days.

(21) Appl. No.: 13/300,277

(22) Filed: Nov. 18, 2011

(65) Prior Publication Data
US 2013/0129154 A1    May 23, 2013

(51) Int. Cl.
*G06K 9/00* (2006.01)
(52) U.S. Cl.
USPC .......................................... 382/107; 382/285
(58) Field of Classification Search
None
See application file for complete search history.

(56) References Cited

U.S. PATENT DOCUMENTS

| 7,477,762 | B2 | 1/2009 | Zhang et al. | |
|---|---|---|---|---|
| 2006/0045380 | A1* | 3/2006 | Jones et al. | 382/276 |
| 2009/0243889 | A1* | 10/2009 | Suhr et al. | 340/932.2 |

OTHER PUBLICATIONS

Yasutaka Furukawa-Jean Ponce, "Accurate Camera Calibration from Multi-View Stereo and Bundle Adjustment", Apr. 21, 2009, Int. Journal of Computer Vision (2009) 84: pp. 257-268.*
C. Engels, H. Stewenius, and D. Nister, "Bundle adjustment rules," In Photogrammetric Computer Vision (PCV'06), 2006, 6 pages.
Bill Triggs, Philip F. McLauchlan, Richard I. Hartley and Andrew W. Fitzgibbon, "Bundle Adjustment—A Modern Synthesis," Proceedings of the International Workshop on Vision Algorithms: Theory and Practice, 1999, 71 pages.
Lourakis, M., Argyros, A., "The design and implementation of a generic sparse bundle adjustment software package based on the Levenberg-Marquardt algorithm," Technical Report 340, Institute of Computer Science—FORTH (2004), 23 pages.
Zhang, J., Boutin, M., and Aliaga, D., "Robust bundle adjustment for structure from motion," Proceedings of the International Conference on Image Processing (ICIP), 2006, 4 pages.
N. Snavely, S. Seitz, and R. Szeliski, "Modeling the world from internet photo collections," International Journal of Computer Vision, vol. 80, No. 2, pp. 189-210, 2008.
M. Pollefeys, L.J.V. Gool, M. Vergauwen, F. Verbiest, K. Cornelis, J. Tops and R. Koch, "Visual Modeling with a Hand-Held Camera", International Journal of Computer Visioin, vol. 59(3), pp. 207-232, 2004.

* cited by examiner

*Primary Examiner* — Barry Drennan
*Assistant Examiner* — Siamak Harandi
(74) *Attorney, Agent, or Firm* — Wolfe-SBMC

(57) ABSTRACT

Methods and apparatus for detecting and removing poorly conditioned points in bundle adjustment. A detection technique may be used to detect poorly conditioned points during the bundle adjustment process or portion of a feature-based 3D reconstruction pipeline. Once the poorly conditioned points are detected, the technique removes the points from the bundle adjustment process. The technique detects and removes the poorly conditioned points before the optimization is performed, and therefore ensures that the optimization will be successful.

20 Claims, 6 Drawing Sheets

DETECTING POORLY CONDITIONED POINTS IN BUNDLE ADJUSTMENT

BACKGROUND

Description of the Related Art

In computer vision, bundle adjustment is the task of refining a reconstruction for a set of images or frames to obtain jointly optimal structure and motion parameter estimates. Optimal as used here indicates that the parameter estimates are found by minimizing some cost function that quantifies the model fitting error, while jointly as used here means that the solution is simultaneously optimal with respect to both structure and motion variations. The name "bundle adjustment" refers to the "bundles" of light rays leaving each three-dimensional (3D) point and converging on each camera center, which are then adjusted optimally with respect to both point and camera parameters.

Bundle adjustment techniques may be employed in many computer vision techniques or workflows involving the processing of multiple images or frames, for example feature-based 3D reconstruction algorithms such as panorama or image stitching, video stabilization, structure from motion (SFM), and so on. In SFM, the task or goal is to estimate the 3D camera motion from a set of point correspondences in a set of images or video frames. In image stitching, the task or goal is to compute camera rotations from point correspondences in a set of images. In video stabilization, the task or goal is to compute parametric image motion, which may range from translations to projective transformations, from tracked points in a video sequence.

Mathematically, bundle adjustment is generally formulated as a nonlinear optimization problem. What is special in bundle adjustment is that bundle adjustment involves two types of unknowns: point unknowns and motion unknowns. There are special coupling structures between the two types of unknowns and among each type of unknown. However, there may be a large number of points and many cameras (images or frames) in a computer vision technique that employs bundle adjustment. For instance, there may be thousands of 3D points in solving SFM for a video of 300 frames.

Thus, in many situations, bundle adjustment may be a nonlinear optimization problem with a large number of unknowns. As in most nonlinear optimization problems, to obtain meaningful results, it is necessary to start from good initial estimates for the unknowns. The problem of getting good initial estimates is pronounced in bundle adjustment in that there may be a very large number of points, and a good initial estimate needs to be obtained for every point. Failure to obtain sufficiently good initial estimates often leads to failure of the entire optimization process. However, in many situations, it is impossible to obtain a good initial estimate for every point because the motion parameters are unknowns.

Another problem often encountered, for example in SFM, is the presence of outlier points. An outlier point is a set of matching points that do not have a unique corresponding 3D point. For instance, outliers often happen in occlusion regions or regions with similar looking texture. For outliers, the optimization with respect to the 3D point is not well defined. Inclusion of such outlier points in bundle adjustment may cause the entire process to fail.

In addition, in SFM for example, some points may come from very far regions, for example sky regions. These points are referred to as points at infinity. Points at infinity constrain the rotation portion of the camera parameters but do not constrain the translation portion. Moreover, the depth at these points is not well defined. Thus, points at infinity should generally only be used as vector directions in 3D (where there are only two unknowns) rather than as full 3D points (where there are three unknowns). However, in practice, without accurate knowledge of the camera parameters, it is hard to detect points at infinity. As a result, points at infinity may often be included in the bundle adjustment step. However, because points at infinity only have two unknowns, treating these points with three unknowns may cause numerical issues not only in the points themselves but also in the camera parameters.

Conventional work in bundle adjustment has often focused on the performance of bundle adjustment techniques. Comparatively little work has been done on improving the robustness of bundle adjustment techniques. One conventional technique has been described that detects outliers by checking the reprojection errors after every run of the optimization. However, there are several limitations in this conventional outlier detection technique. For example, detecting outliers through reprojection errors is problematic. It is possible that the points that have high reprojection errors are not converged yet, and removing these points will result in the loss of information. In fact, the points that have high reprojection errors may be the points carrying the most information. As another example, checking reprojection errors may not catch points at infinity as the reprojection errors for those points may be low. Including points at infinity can introduce problems as the corresponding matrix is not invertible. As another example, outlier points may cause so many problems that it is not even possible to run one optimization iteration. When this happens, the conventional outlier detection technique simply does not work.

SUMMARY

Various embodiments of methods and apparatus for detecting and removing poorly conditioned points in bundle adjustment are described. Embodiments of a technique for detecting and removing these poorly conditioned points in bundle adjustment are described. Embodiments of the technique may be used to detect poorly conditioned points during the bundle adjustment process or portion of a feature-based 3D reconstruction pipeline. Once the poorly conditioned points are detected, the technique removes the points from the bundle adjustment process. The technique detects and removes the poorly conditioned points before the optimization, is performed, and therefore ensures that the optimization will be successful.

Embodiments of the technique for detecting and removing poorly conditioned points may be employed at each application of bundle adjustment in a feature-based 3D reconstruction pipeline. The detection technique may be performed, and detected poorly conditioned points may be removed, prior to the optimization portion of bundle adjustment. In at least some embodiments, one or more structures for the optimization may be set up or initialized according to an input reconstruction. The detection technique may be applied to detect poorly conditioned points, and the poorly conditioned points may be collected and removed or marked so that they are not used during the optimization. The optimization may then be performed using only the well-conditioned points. Bundle adjustment may generally be an iterative optimization process, and thus the optimization output may be used as input to another iteration in which set up, the detection technique and point removal, and optimization are again performed. After bundle adjustment has completed, an optimized reconstruction that contains jointly optimal structure and motion parameter estimates may be output.

In at least some embodiments the Levenberg-Marquardt (L-M) algorithm may be used in bundle adjustment. In particular, a sparse bundle adjustment implementation using the L-M algorithm may be used in some embodiments. The detection technique can be applied at each iteration of the L-M algorithm (i.e., at every new Jacobian computation) to detect and remove poorly conditioned points prior to optimization at this iteration of the L-M algorithm.

In the sparse bundle adjustment implementation using the L-M technique, a Jacobian matrix may be computed for an input reconstruction, and a 3×3 matrix $V_i$ may be computed for all the points. The rank of $V_i$ for all the points may then be checked. If $V_i$ for a given point does not have full rank (rank 3), the matrix is rank-deficient and the corresponding point is declared or marked as poorly conditioned. All of the poorly conditioned points are collected and removed together. The bundle adjustment optimization can then be performed using the set of remaining, well-conditioned points. In at least some embodiments, detecting rank deficiency can be done numerically by checking the distribution of the eigenvalues of matrix $V_i$.

Figure 1:
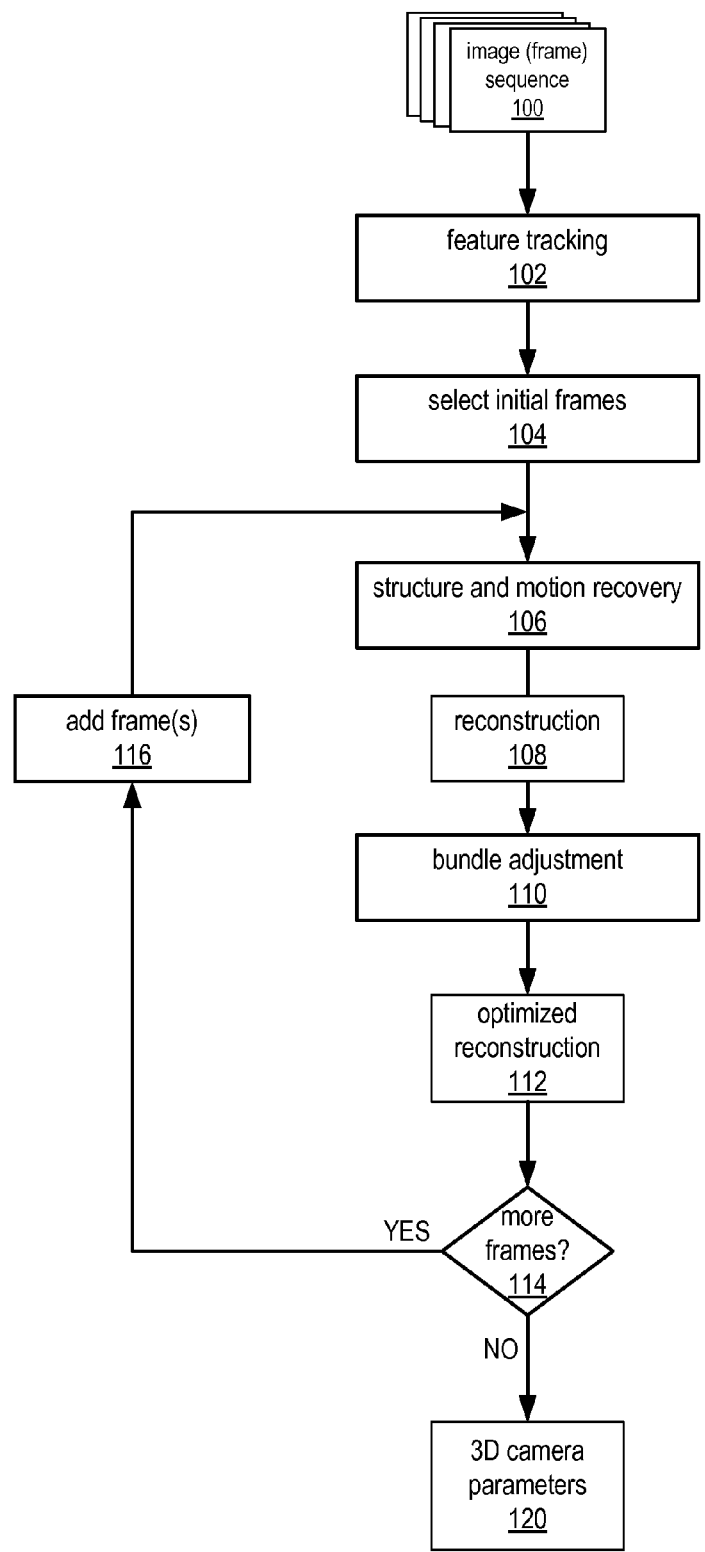
FIG. 1 illustrates an example feature-based 3D reconstruction pipeline in which a bundle adjustment portion employs an embodiment of the technique for detecting and removing poorly conditioned points.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm as described herein, is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for detecting and removing poorly conditioned points in bundle adjustment are described. In computer vision, bundle adjustment is the task of refining a reconstruction for a set of images or frames to obtain jointly optimal structure and motion parameter estimates. Bundle adjustment techniques may be employed in many computer vision techniques or workflows involving the processing of multiple images or frames, for example feature-based 3D reconstruction algorithms such as panorama or image stitching, video stabilization, structure from motion (SFM), and so on.

In many situations, for example in an SFM pipeline, bundle adjustment may be a nonlinear optimization problem with a large number of unknowns. As in most nonlinear optimization problems, to obtain meaningful results, it is necessary to start from good initial estimates for the unknowns. However, in many situations, it is impossible to obtain a good initial estimate for every point because the motion parameters are unknowns, which may result in some points with poor initial estimates. In addition, a set of matching points may not have a unique corresponding 3D point, which results in what is termed as an outlier point. Furthermore, some points may come from very far regions, for example sky regions. These points may be referred to as points at infinity. Points at infinity constrain the rotation portion of the camera parameters but do not constrain the translation portion. Moreover, the depth at these points is not well defined. Thus, points at infinity should not be used as full 3D points.

These three types of points (points with poor initial estimates, outliers, and points at infinity) may be referred to as poorly conditioned points. Poorly conditioned points are points that do not converge properly during the optimization process. Including poorly conditioned points in the bundle adjustment process may result in suboptimal results or may even cause the entire bundle adjustment process to fail.

Embodiments of a technique for detecting and removing these poorly conditioned points in bundle adjustment are described. Embodiments of the technique may be used to detect poorly conditioned points during the bundle adjustment process or portion of a feature-based 3D reconstruction pipeline (e.g., an SFM pipeline). Once the poorly conditioned points are detected, the technique removes the points from the bundle adjustment process. The technique detects and removes the poorly conditioned points before the optimization, is performed, and therefore ensures that the optimization will be successful. The technique is efficient and works reliably in practice.

Structure from Motion (SFM) Example

FIG. 1 illustrates a Structure from Motion (SFM) pipeline that is given as an example of a feature-based 3D reconstruction pipeline in which a bundle adjustment portion of the pipeline employs an embodiment of the technique for detecting and removing poorly conditioned points. The detection technique is performed prior to optimization performed during bundle adjustment. Note that embodiments of the detection technique may be similarly employed in other feature-based 3D reconstruction pipelines, for example in an image stitching pipeline or video stabilization pipeline.

Structure from Motion (SFM) aims to find the 3D structures of a static scene, for example from a video taken by a camera moving around the scene. For example, a photographer may take a lot of pictures while walking on the Great Wall of China, or in some other similar environment. Later, the photographer may want to reconstruct the 3D scene as well as figure out where the images are taken, potentially without knowing anything about the camera such as its focal length. In cases like this, the photographer needs a solution to the SFM problem.

To reconstruct the 3D from the images in an image sequence 100, the SFM pipeline first needs to connect all the images together. This can be done, for example, by a feature tracking 102 module that detects, matches, and tracks feature points over the entire sequence 100, such as corner features or SIFT features. Each detected feature now corresponds to a point trajectory over time. Note that the point trajectories may appear or disappear at any time and usually only span a subsequence of the entire video or image sequence 100. These trajectories serve as the input to most SFM systems.

Next, structure and motion parameters (e.g., estimates for camera parameters including but not limited to focal lengths, and 3D coordinates for the points) need to be recovered. SFM methods, as noted above, generally start with a set of feature points and/or trajectories, for example using SIFT features. Then, two or three frames are carefully selected as indicated at 104 to initialize the structure and motion recovery. Structure and motion recovery 106 is then performed to generate a first or initial projective 3D reconstruction 108 that includes estimates for camera parameters and 3D coordinates for the points. Bundle adjustment 110 may be applied to the reconstruction 108 to obtain jointly optimal structure and motion parameter estimates (optimized reconstruction 112). At 114, if there are more frames to be processed, one or more additional frames are added into the reconstruction as indicated at 116, and the pipeline returns to element 106. Thus, the images in sequence 100 may be processed by the pipeline in an incremental or iterative fashion. For example, at each iteration, a frame with the largest number of matches with the current frame may be found and added at 116. Bundle adjustment 110 may be applied to the reconstruction at each iteration.

At 114, if there are no more frames to be processed, 3D camera parameters 120 may be provided as output of the SFM pipeline.

At some point of the SFM pipeline processing, camera calibration may be performed. By that time, the rotation and translation of each camera may be recovered with regard to some world coordinate system.

In some implementations of an SFM pipeline, as an alternative to performing bundle adjustment at the first reconstruction and at each subsequent reconstruction as new frame(s) are added, all of the frames may be processed to generate a reconstruction, and bundle adjustment may be applied at or near the end of the process.

Figure 2:
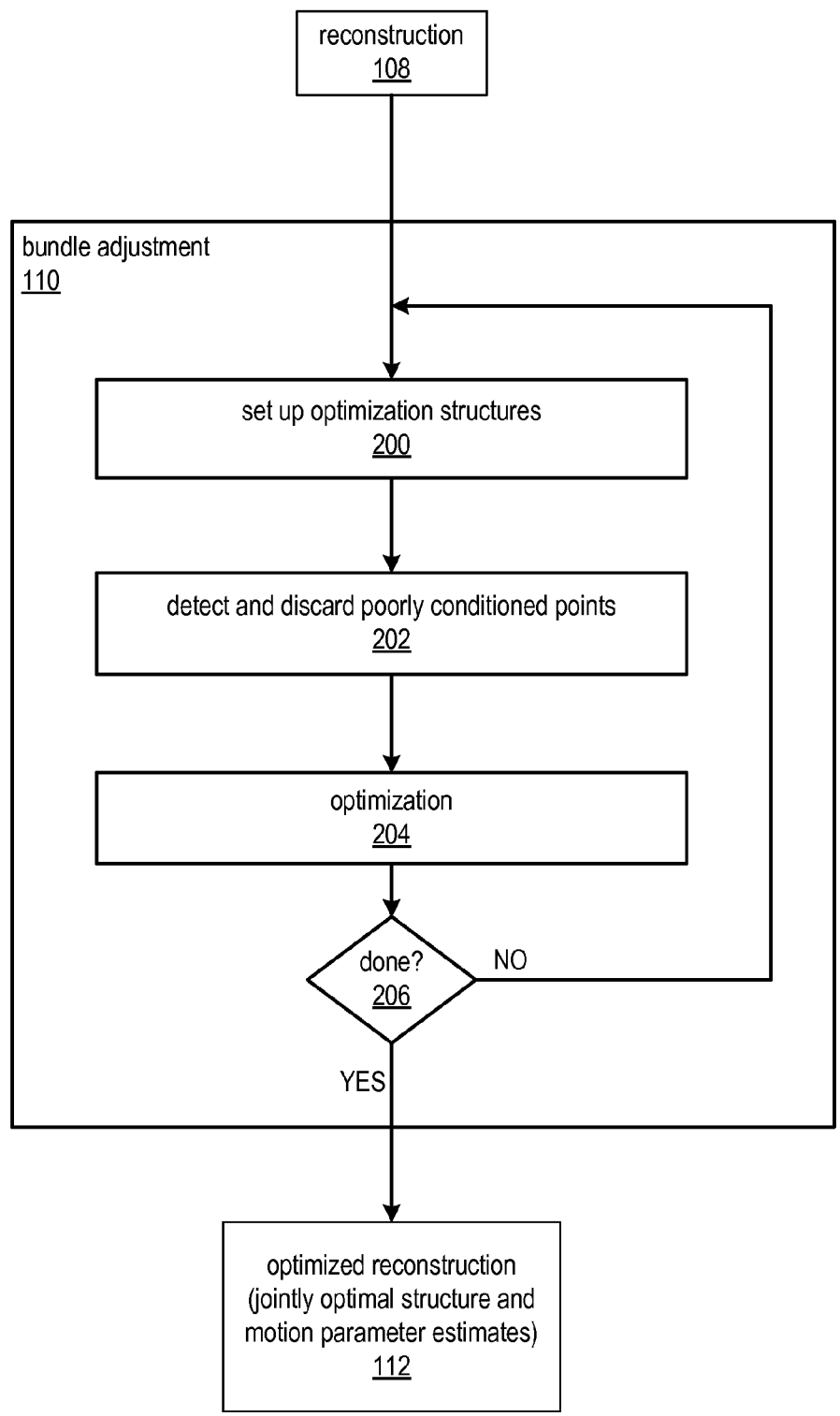
FIG. 2 illustrates an example bundle adjustment technique that detects and removes poorly conditioned points, according to at least some embodiments.

Embodiments of the technique for detecting and removing poorly conditioned points may be employed at each application of bundle adjustment 110 in the above-described SFM pipeline. The detection technique may be performed, and detected poorly conditioned points may be removed, prior to the optimization portion of bundle adjustment 110. FIG. 2 illustrates an example bundle adjustment 110 technique that employs a technique for detecting and removing poorly conditioned points, according to at least some embodiments. At 200, one or more structures for the optimization may be set up or initialized according to the input reconstruction 108. At 202, the detection technique may be applied to detect poorly conditioned points; the poorly conditioned points may be collected and removed or marked so that they are not used during the optimization. At 204, the optimization may be performed using only the well-conditioned points.

The optimization may generally be an iterative optimization process, and thus, at 206, if the optimization has not completed, the bundle adjustment method returns to 200. At 206, if bundle adjustment has been completed, then an optimized reconstruction 112 that contains jointly optimal structure and motion parameter estimates may be output.

In at least some embodiments, in bundle adjustment 110, the Levenberg-Marquardt (L-M) algorithm may be used. In particular, a sparse bundle adjustment implementation using the L-M technique may be used in some embodiments. The detection technique can be applied at each iteration of the L-M algorithm (i.e., at every new Jacobian computation) to detect and remove poorly conditioned points prior to optimization at this iteration of the L-M algorithm.

Bundle Adjustment Techniques

Embodiments of the technique for detecting poorly conditioned points may be used, for example, in or with various bundle adjustment techniques. The following first describes example bundle adjustment techniques with which the technique for detecting poorly conditioned points may be used. Bundle adjustment may generally be formulated as a large nonlinear optimization. A nonlinear optimization technique, and in particular a nonlinear least squares optimization technique, are described. Embodiments of the technique for detecting and removing poorly conditioned points in bundle adjustment, prior to the optimization, are then described.

Levenberg-Marquardt Algorithm for Nonlinear Least Squares Optimization

Let $x \in \square^n$ be the unknown vector and $$f(x)=[f_1(x), \ldots, f_m(x)]^T \in \square^m$$

be the vector of residuals. Each $f_i(x)$ is a nonlinear function of x. The task in nonlinear least squares optimization is to solve the following problem:

$$\arg\min_x \sum_{i=1}^m f_i^2(x) \tag{1}$$

starting from a initial guess of the unknown at $x=x_0$. The Levenberg-Marquardt (L-M) algorithm is a well-known algorithm for solving nonlinear least squares problems. The L-M algorithm, in its simplest form, is a blend of gradient descent and the Gauss-Newton method. It says that the optimal unknown can be searched according to the following iterative procedure starting from $x_0$:

$$x_{i+1}=x_i-(J^TJ+\lambda D^TD)^{-1}J^Tf \tag{2}$$

where $J \in \square^{m \times n}$ is the Jacobian matrix of f evaluated at $x_i$ and D is a non-negative diagonal matrix, which is typically chosen as the square root of the diagonal elements of $J^TJ$. Lambda ($\lambda$) is a non-negative parameter that is computed at each iteration and controls the relative ratio between $J^TJ$ (Gauss-Newton) and $D^TD$ (steepest descent). The matrix:

$$H_\lambda = J^TJ+\lambda D^TD \in \square^{n \times n}$$

is known as the augmented Hessian matrix.

A dense version of bundle adjustment may be implemented by solving equation (2). However, equation (2) solves for all unknowns, and there may be thousands of points and many cameras, and thus thousands of unknowns. Thus, solving equation (2) can result in a large, expensive optimization. In particular, equation (2) results in very large matrices, and inverting large matrices is expensive; even indirect methods tend to be slow. Thus, a sparse bundle adjustment technique may be used that leverages special coupling structures in the $J^TJ$ matrix. $J^TJ$ is a sparse matrix, and this sparsity can be exploited to make things faster.

Sparse Bundle Adjustment

In bundle adjustment, the unknown vector can be organized according to camera (c) unknowns and point (p) unknowns:

$$x=[x_c, x_p]^T \tag{3}$$

where $x_c$ collects the unknowns for all the cameras and $x_p$ collects the unknowns for all the points. J and D can be rewritten in a similar way as:

$$J=[J_c, J_p]^T \text{ and } D=[D_c, D_p]^T \tag{4}$$

where $J_c$ corresponds to the derivatives of f with respect to $x_c$ and $J_p$ corresponds to the derivatives of f with respect to $x_p$. The augmented Hessian matrix $H_\lambda$ can be written in the following way:

$$J^TJ+\lambda D^TD = \begin{bmatrix} U & W \\ W^T & V \end{bmatrix} \tag{5}$$

where $$U=+J_c^TJ_c+\lambda D_c^TD_c, V=J_p^TJ_p+\lambda D_p^TD_p, \text{ and } U=J_c^TJ_p. \tag{6}$$

Note that, for most bundle adjustment problems, V is a block diagonal matrix. With this observation, the Schur complement technique may be used to efficiently compute the quantity $(J^TJ+\lambda D^TD)^{-1}J^Tf$ as follows.

The quantity $(J^TJ+\lambda D^TD)^{-1}J^Tf$ is the solution of the following equation:

$$(J^TJ+\lambda D^TD)\delta=J^Tf, \tag{7}$$

or, equivalently:

$$\begin{bmatrix} U & W \\ W^T & V \end{bmatrix} \begin{bmatrix} \delta_c \\ \delta_p \end{bmatrix} = \begin{bmatrix} J_c f \\ J_p f \end{bmatrix} \tag{8}$$

where $$\delta=[\delta_c, \delta_p]^T.$$

Multiplying both sides of equation (8) by:

$$\begin{bmatrix} I & -WV^{-1} \\ 0 & I \end{bmatrix},$$

the following is obtained:

$$\begin{bmatrix} U-WV^{-1}W^T & 0 \\ W^T & V \end{bmatrix} \begin{bmatrix} \delta_c \\ \delta_p \end{bmatrix} = \begin{bmatrix} J_c f - WV^{-1}J_p f \\ J_p f \end{bmatrix} \tag{9}$$

From equation (9) $\delta_c$ may be solved as follows:

$$(U-WV^{-1}W^T)\delta_c=J_c f-WV^{-1}J_p f. \tag{10}$$

Once $\delta_c$ is obtained, $\delta_p$ may be solved as follows:

$$V\delta_p=J_p f-W^T\delta_c. \tag{11}$$

For the Schur complement technique to work, $V^{-1}$ needs to be computed efficiently. For most bundle adjustment problems, $x_p$ can be subdivided into the unknowns for each point as:

$$x_p=[x_{p1}, \ldots, x_{pN}]^T \tag{12}$$

where N is the number of points. Note that there is no sharing of unknowns between different points. It turns out that for most bundle adjustment problems there is no coupling between points in the cost function f either. In other words, once the camera unknowns are given, the optimization with respect to all the points can be solved one point at a time. This observation shows up in that V is a block diagonal matrix where each block corresponds to a point:

$$V = \begin{bmatrix} V_1 & & \\ & \ldots & \\ & & V_N \end{bmatrix}. \tag{13}$$

Therefore, $V^{-1}$ can be computed by inverting each $V_i$ separately:

$$V^{-1} = \begin{bmatrix} V_1^{-1} & & \\ & \ldots & \\ & & V_N^{-1} \end{bmatrix}. \quad (14)$$

Note that another requirement for the Schur complement technique to work is that V is non-singular. This means $V_i$ has to be non-singular for all the points. It will be shown in the next section that $V_i$ turns out to be close to singular for poorly conditioned points.

The above-described sparse bundle adjustment technique only exploits the so-called "primary structure," that is the coupling structure between camera unknowns and point unknowns. There also exists a "secondary structure," a coupling structure between individual camera unknowns. However, the secondary structure may not need to be used.

Also note that the sparse bundle adjustment technique produces the same or very similar results as the dense bundle adjustment technique in which equation (2) is directly optimized. In other words, sparse bundle adjustment is not an approximation.

Technique for Detecting and Removing Poorly Conditioned Points in Bundle Adjustment This section describes embodiments of the technique for detecting poorly conditioned points that may be used, for example, with the above-described sparse bundle adjustment technique at each iteration prior to the optimization (i.e., at every new Jacobian computation) to detect and remove poorly condition points, thus ensuring that the optimization functions correctly.

It can be observed empirically that, for poorly conditioned points, the corresponding $V_i$ is singular. For instance, for Structure from Motion (SFM), $V_i$ should be of rank 3 for a regular, well-conditioned point. However, for poorly conditioned points, $V_i$ has rank 2 or sometimes even rank 1 or 0. A detection algorithm that detects poorly conditioned points is described that leverages this observation.

Figure 3:
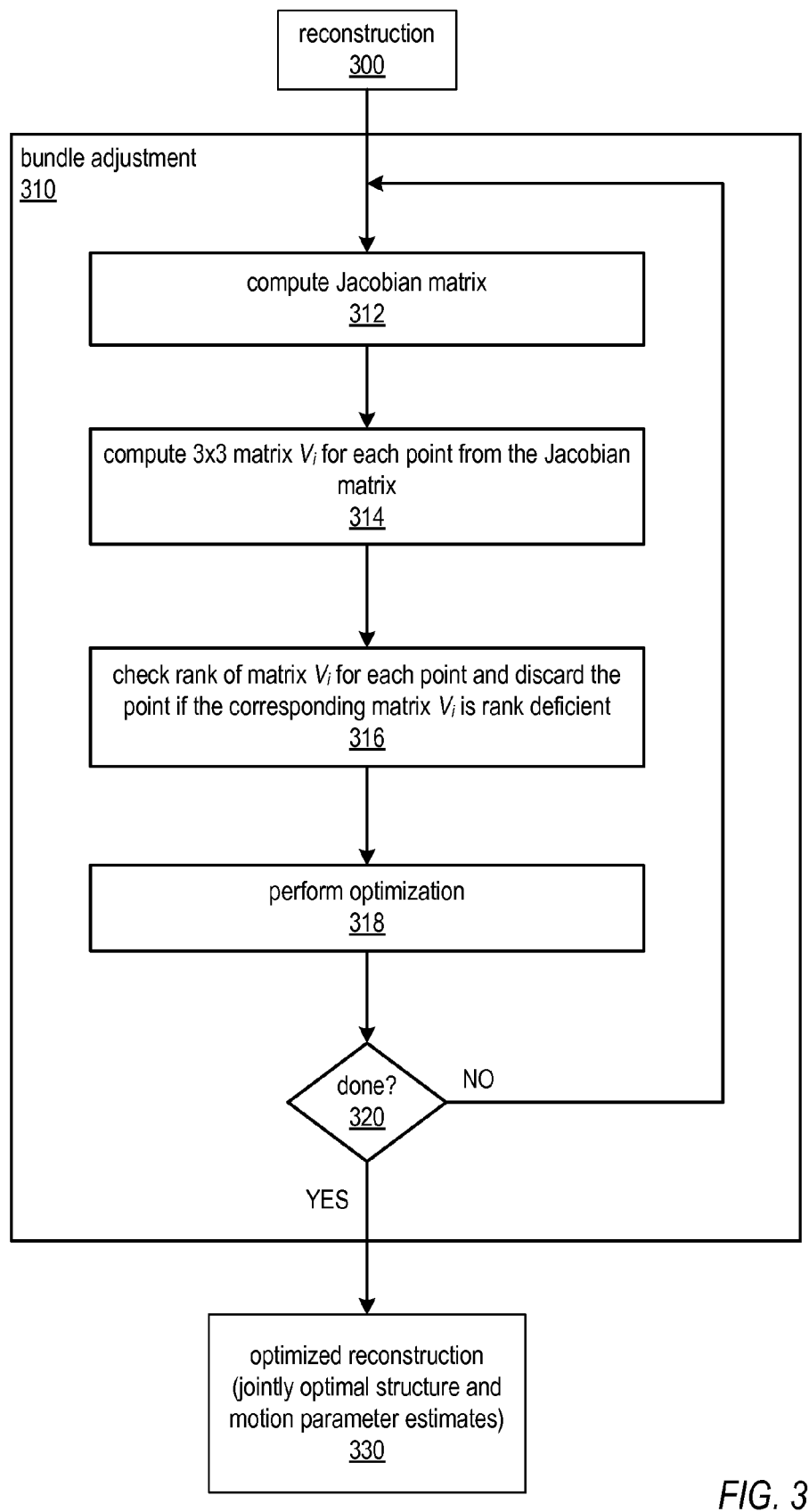
FIG. 3 illustrates an example sparse bundle adjustment technique that detects and removes poorly conditioned points at each iteration prior to optimization, according to at least some embodiments.

FIG. 3 illustrates an example sparse bundle adjustment technique 310 that employs the detection algorithm at each iteration prior to the optimization, according to at least some embodiments. A structure and motion recovery process may generate a reconstruction 300 as input to bundle adjustment 310. At 312, a Jacobian matrix may be computed for the reconstruction 300, as previously described. At 314, the 3×3 matrix $V_i$ is computed for all the points, as previously described. At 316, the rank of $V_i$ for all the points is checked to determine if the matrix is rank-deficient. If $V_i$ for a given point does not have full rank (rank 3), the matrix is rank-deficient and the point $x_{p_i}$ is declared or marked as poorly conditioned. All of the poorly conditioned points are collected and removed together. The bundle adjustment optimization can then be performed using the set of remaining, well-conditioned points, as indicated at 318.

At 320, if the bundle adjustment is done, then an optimized reconstruction 330 that contains jointly optimal structure and motion parameter estimates may be output. If the bundle adjustment is not done, then the method may return to element 312.

Figure 4:
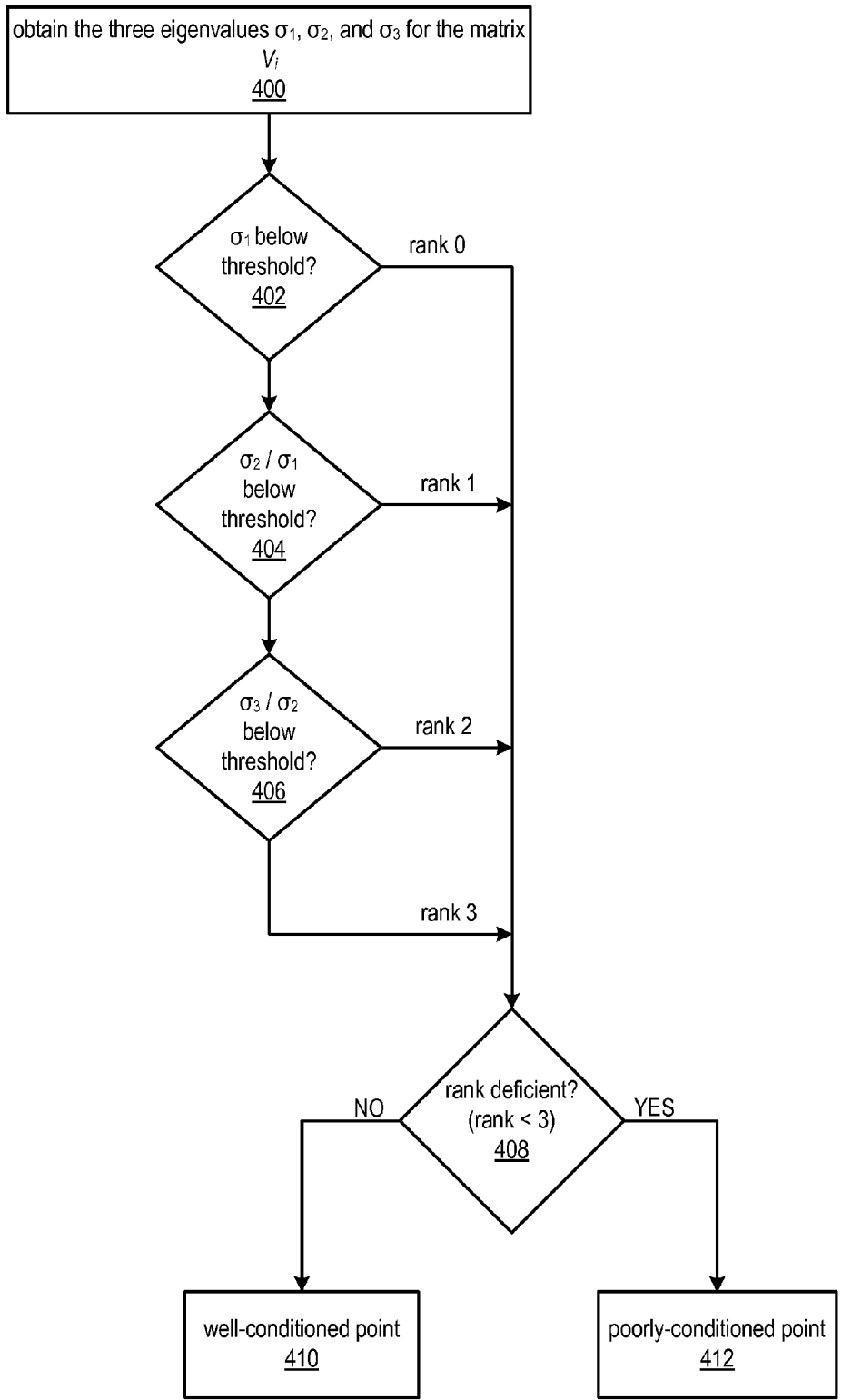
FIG. 4 illustrates a method for detecting rank deficiency of a matrix $V_i$ for a point, according to at least some embodiments.

FIG. 4 illustrates a method for detecting rank deficiency of a matrix according to at least some embodiments. In at least some embodiments, detecting rank deficiency can be done numerically by checking the distribution of the eigenvalues of matrix $V_i$. Note that $V_i$ is a real symmetric matrix and therefore has three real eigenvalues. In particular, since $V=J_p^T J_p$, $V_i$ is positive definite if it has full rank and positive semi-definite if it is rank deficient.

As indicated at 400, the three eigenvalues for the matrix $V_i$ may be obtained. Let:

$$\sigma_1 > \sigma_2 > \sigma_3 \geq 0$$

be the three eigenvalues of a particular $V_i$ sorted in a descending order. As indicated at 402, the technique may first check $\sigma_1$. If $\sigma_1$ is below a threshold, then $V_i$ has rank 0. Otherwise, as indicated at 404, the technique computes the ratio $$\frac{\sigma_2}{\sigma_1}.$$

If $$\frac{\sigma_2}{\sigma_1}$$

is below a threshold, $V_i$ has rank 1. Otherwise, as indicated at 406, the technique computes the ratio $$\frac{\sigma_3}{\sigma_2}.$$

If $$\frac{\sigma_3}{\sigma_2}$$

is below a threshold, $V_i$ has rank 2. At 408, if any of these three cases (rank 0, 1, or 2) happens, $x_{p_i}$ is determined as a poorly conditioned point 412. Otherwise, $x_{p_i}$ is a well-conditioned point 410.

Note that this detection algorithm may be performed, and the detected poorly conditioned points removed, before performing the bundle adjustment optimization. As a result, poorly conditioned points will not affect good (well-conditioned) points or cameras. When the optimization is restarted, it does not have to start from the beginning The estimates for the good points and cameras from the last iteration can be used as they are not affected by the bad points. The detection algorithm can be used at each iteration of the Levenberg-Marquardt (L-M) algorithm (i.e., at every new Jacobian computation), as it is efficient.

By detecting and removing poorly conditioned points prior to optimization during bundle adjustment, the above-described techniques may make bundle adjustment more robust. Failing to detect and remove poorly conditioned points may cause the entire optimization process to fail even if there are only one or two offending points. The detection algorithm can detect all three cases of poorly conditioned points (points with poor initial estimates, outliers, and points at infinity). The detection algorithm does not use reprojection errors and is thus not subject to the limitations of conventional methods. In particular, the detection algorithm detects problems before they get into the optimization process to thus ensure that bundle adjustment is successful as a whole. In addition, the detection algorithm is efficient. The computation for the eigenvalues of a real symmetric 3×3 matrix can be done in a closed form. Since $V_i$ needs to be computed anyway, there is little overhead in running the detection algorithm. Thus, the detection algorithm can be applied at each iteration of the L-M algorithm in the bundle adjustment process.

While the detection algorithm for detecting poorly conditioned points is described in relation to bundle adjustment, and in particular in relation to a bundle adjustment technique that employs the Levenberg-Marquardt algorithm for nonlinear least squares optimization, note that the detection algorithm can be used with other bundle adjustment techniques and in other applications than bundle adjustment.

Example Implementations

Some embodiments may include a means for detecting and removing poorly conditioned points in a bundle adjustment technique prior to optimization. For example, a bundle adjustment module may receive a reconstruction, and perform an iteratively optimization of the reconstruction to generate an optimized reconstruction containing jointly optimal structure and motion parameter estimates. At each iteration, the technique for detecting poorly conditioned points may be applied and the detected poorly conditioned points removed prior to optimizing. The bundle adjustment module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform the bundle adjustment technique including the detection and removal of poorly conditioned points, as described herein. Other embodiments of the bundle adjustment module may be at least partially implemented by hardware circuitry and/or firmware stored, for example, in a non-volatile memory.

Figure 5:
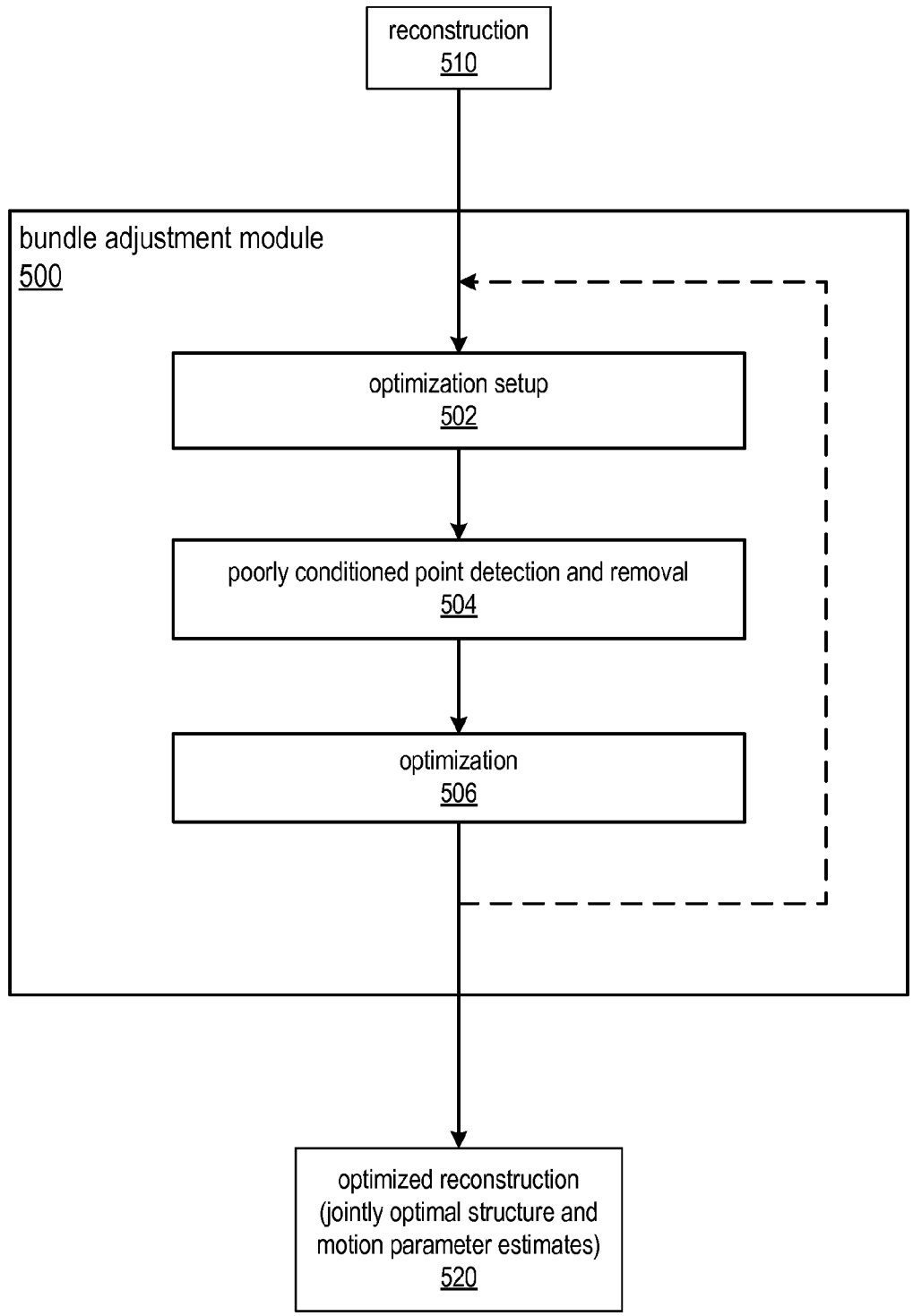
FIG. 5 illustrates an example bundle adjustment module that detects and removes poorly conditioned points prior to optimization, according to some embodiments.
Figure 6:
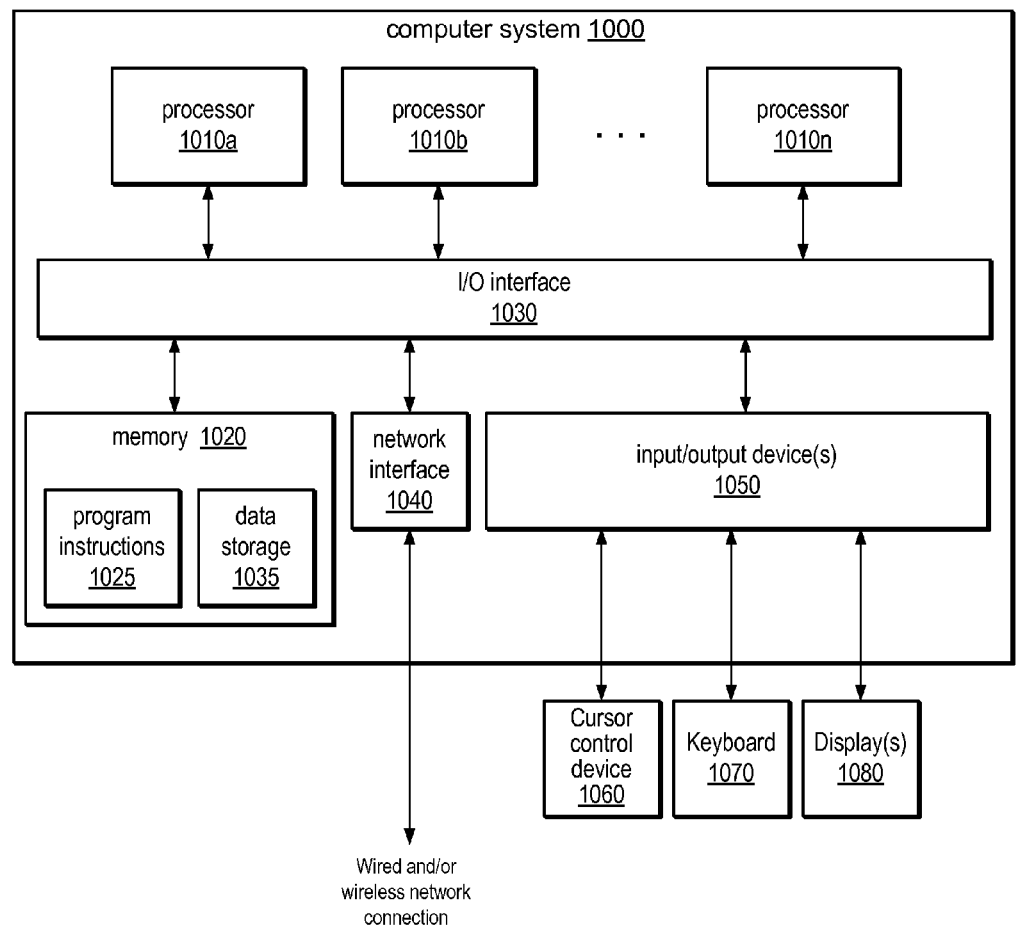
FIG. 6 illustrates an example computer system that may be used in embodiments.

Embodiments of a bundle adjustment module that implements the technique for detecting and removing poorly conditioned points may, for example, be implemented as a standalone application, as a module of an application or pipeline, as a plug-in for applications or pipelines including image or video processing applications or pipelines, and/or as a library function that may be called by other modules or by applications or pipelines such as image processing or video processing applications or pipelines. Embodiments of the bundle adjustment module may be implemented in any image or video processing application, or more generally in any application in which video or image sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. An example bundle adjustment module that may implement the techniques for detecting and removing poorly conditioned points as described herein are illustrated in FIG. 5. An example computer system on which the module may be implemented is illustrated in FIG. 6. Note that the bundle adjustment module may be implemented in still cameras and/or video cameras.

FIG. 5 illustrates a bundle adjustment module that may implement the techniques for detecting and removing poorly conditioned points as illustrated in FIGS. 2 through 4. FIG. 6 illustrates an example computer system on which embodiments of bundle adjustment module 500 may be implemented. Module 500 receives as input an initial reconstruction 510. At 502, optimization setup is performed to set up or initialized one or more structures for the optimization according to the input reconstruction 510. At 504, the detection technique may be applied to detect poorly conditioned points; the poorly conditioned points may be collected and removed or marked so that they are not used during optimization. At 506, optimization may be performed using only the well-conditioned points. Elements 502 through 506 may be repeated until bundle adjustment is done, for example until jointly optimal structure and motion parameter estimates are realized. When bundle adjustment is completed, an optimized reconstruction 520 that contains the jointly optimal structure and motion parameter estimates may be output.

Example System

Embodiments of a bundle adjustment module and/or of the techniques for detecting and removing poorly conditioned points as described herein may be executed on one or more computer systems, which may interact with various other devices. One such computer system is illustrated by FIG. 6. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a bundle adjustment module and/or of the techniques for detecting and removing poorly conditioned points are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 6, memory 1020 may include program instructions 1025, configured to implement embodiments of a bundle adjustment module and/or of the techniques for detecting and removing poorly conditioned points as described herein, and data storage 1035, comprising various data accessible by program instructions 1025. In one embodiment, program instructions 1025 may include software elements of embodiments of a bundle adjustment module and/or of the techniques for detecting and removing poorly conditioned points as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a bundle adjustment module and/or of the techniques for detecting and removing poorly conditioned points as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    performing, by one or more computing devices:
        obtaining structure and motion parameter estimates for a three-dimensional (3D) reconstruction of a scene based on a set of images, the structure and motion parameters including one or more camera parameters and a plurality of 3D points in the scene; and
        applying bundle adjustment to the structure and motion parameter estimates, said bundle adjustment comprises:
            computing a 3×3 matrix for each of the plurality of 3D points from a Jacobian matrix for the structure and motion parameter estimates;
            detecting one or more poorly conditioned points in the plurality of 3D points, said detecting for each of the plurality of 3D points comprises checking a rank of the respective 3×3 matrix, where a corresponding 3D point is poorly conditioned if the rank is less than 3;
            removing the detected one or more poorly conditioned points from the plurality of 3D points; and
            optimizing the structure and motion parameter estimates to generate optimized structure and motion parameter estimates.

2. The method as recited in claim 1, further comprising repeating said detecting, said removing, and said optimizing until jointly optimal structure and motion parameter estimates are realized.

3. The method as recited in claim 1, wherein said bundle adjustment is implemented according to a nonlinear optimization technique.

4. The method as recited in claim 1, wherein said bundle adjustment is a sparse bundle adjustment technique implemented according to the Levenberg-Marquardt (L-M) algorithm.

5. The method as recited in claim 1, wherein said checking the rank of the respective 3×3 matrix comprises:
    determining that the rank is 0 if a first of three eigenvalues for the 3×3 matrix is below a threshold;
    determining that the rank is 1 if the ratio of a second of the three eigenvalues to the first of the three eigenvalues is below a threshold; and
    determining that the rank is 2 if the ratio of a third of the three eigenvalues to the second of the three eigenvalues is below a threshold.

6. The method as recited in claim 1, wherein said bundle adjustment is performed in a structure from motion (SFM) pipeline.

7. The method as recited in claim 1, wherein said detecting comprises detecting points at infinity in the scene as the one or more poorly conditioned points that are said removed from the plurality of 3D points.

8. A system, comprising:
    at least one processor; and
    a memory comprising program instructions that are executable by the at least one processor to implement a bundle adjustment module operable to:
        obtain structure and motion parameter estimates for a three-dimensional (3D) reconstruction of a scene based on a set of images, the structure and motion parameters including one or more camera parameters and a plurality of 3D points in the scene;
        compute a 3×3 matrix for each of the plurality of 3D points from a Jacobian matrix for the structure and motion parameter estimates;
        detect one or more poorly conditioned points in the plurality of 3D points by checking, for each of the plurality of 3D points, a rank of the respective 3×3 matrix, where a corresponding 3D point is poorly conditioned if the rank is less than 3;
        remove the detected one or more poorly conditioned points from the plurality of 3D points; and
        optimize the structure and motion parameter estimates to generate optimized structure and motion parameter estimates.

9. The system as recited in claim 8, wherein the bundle adjustment module is operable to repeat operations to said detect the one or more poorly conditioned points, remove the detected one or more poorly conditioned points, and optimize until jointly optimal structure and motion parameter estimates are realized.

10. The system as recited in claim 8, wherein said bundle adjustment module implements a nonlinear optimization technique.

11. The system as recited in claim 8, wherein said bundle adjustment module implements a sparse bundle adjustment technique according to the Levenberg-Marquardt (L-M) algorithm.

12. The system as recited in claim 8, wherein, to check the rank of the respective 3×3 matrix, the bundle adjustment module is operable to:
    determine that the rank is 0 if a first of three eigenvalues for the 3×3 matrix is below a threshold;
    determine that the rank is 1 if the ratio of a second of the three eigenvalues to the first of the three eigenvalues is below a threshold; and
    determine that the rank is 2 if the ratio of a third of the three eigenvalues to the second of the three eigenvalues is below a threshold.

13. The system as recited in claim 8, wherein the bundle adjustment module is operable to said detect points at infinity in the scene as the one or more poorly conditioned points that are said removed from the plurality of 3D points.

14. A non-transitory computer-readable storage medium comprising stored program instructions that are computer-executable to implement:
  obtaining structure and motion parameter estimates for a three-dimensional (3D) reconstruction of a scene based on a set of images, the structure and motion parameters including one or more camera parameters and a plurality of 3D points in the scene; and
  applying a bundle adjustment technique to the structure and motion parameter estimates, wherein said bundle adjustment technique comprises:
    computing a 3×3 matrix for each of the plurality of 3D points from a Jacobian matrix for the structure and motion parameter estimates;
    detecting one or more poorly conditioned points in the plurality of 3D points and removing the detected one or more poorly conditioned points from the plurality of 3D points, said detecting for each of the plurality of 3D points comprises checking a rank of the respective 3×3 matrix, where a corresponding 3D point is poorly conditioned if the rank is less than 3; and
    optimizing the structure and motion parameter estimates to generate optimized structure and motion parameter estimates.

15. The non-transitory computer-readable storage medium as recited in claim 14, wherein the program instructions are computer-executable to implement repeating said detecting, said removing, and said optimizing until jointly optimal structure and motion parameter estimates are realized.

16. The non-transitory computer-readable storage medium as recited in claim 14, wherein said bundle adjustment technique is implemented according to a nonlinear optimization technique.

17. The non-transitory computer-readable storage medium as recited in claim 14, wherein said bundle adjustment technique is a sparse bundle adjustment technique implemented according to the Levenberg-Marquardt (L-M) algorithm.

18. The non-transitory computer-readable storage medium as recited in claim 14, wherein, in said checking the rank of the respective 3×3 matrix, the program instructions are computer-executable to implement:
  determining that the rank is 0 if a first of three eigenvalues for the 3×3 matrix is below a threshold;
  determining that the rank is 1 if the ratio of a second of the three eigenvalues to the first of the three eigenvalues is below a threshold; and
  determining that the rank is 2 if the ratio of a third of the three eigenvalues to the second of the three eigenvalues is below a threshold.

19. The non-transitory computer-readable storage medium as recited in claim 14, wherein said bundle adjustment technique is performed in a structure from motion (SFM) pipeline.

20. The non-transitory computer-readable storage medium as recited in claim 14, wherein said detecting comprises detecting points at infinity in the scene as the one or more poorly conditioned points that are said removed from the plurality of 3D points.

* * * * *

UNITED STATES PATENT AND TRADEMARK OFFICE
CERTIFICATE OF CORRECTION

PATENT NO. : 8,693,734 B2  Page 1 of 1
APPLICATION NO. : 13/300277
DATED : April 8, 2014
INVENTOR(S) : Hailin Jin It is certified that error appears in the above-identified patent and that said Letters Patent is hereby corrected as shown below:

In the Claims

Column 17, Line 12, Claim 14, after "...parameter estimates," delete "wherein", therefor.

Signed and Sealed this
Fifteenth Day of July, 2014

Michelle K. Lee
*Deputy Director of the United States Patent and Trademark Office*